United States Patent
Pázmány et al.

(10) Patent No.: US 10,021,603 B2
(45) Date of Patent: Jul. 10, 2018

(54) METHODS FOR HANDLING A CONNECTION STATUS

(71) Applicant: Telefonaktiebolaget LM Ericsson (publ), Stockholm (SE)

(72) Inventors: Dénes György Pázmány, Aachen (DE); Tony Edman, Herzogenrath (DE); Michael Mause, Köln (DE); Stephan Muetter, Aachen (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 54 days.

(21) Appl. No.: 15/037,025

(22) PCT Filed: Nov. 20, 2013

(86) PCT No.: PCT/EP2013/074244
§ 371 (c)(1),
(2) Date: May 16, 2016

(87) PCT Pub. No.: WO2015/074683
PCT Pub. Date: May 28, 2015

(65) Prior Publication Data
US 2016/0295467 A1    Oct. 6, 2016

(51) Int. Cl.
*H04W 36/00*    (2009.01)
*H04L 29/06*    (2006.01)
(Continued)

(52) U.S. Cl.
CPC ......... *H04W 36/0022* (2013.01); *H04J 11/00* (2013.01); *H04L 41/0681* (2013.01);
(Continued)

(58) Field of Classification Search
None
See application file for complete search history.

(56) References Cited

U.S. PATENT DOCUMENTS 8,130,934 B1 * 3/2012 Croak ............... H04M 3/4286
                                                   370/259
9,100,407 B2 * 8/2015 Shaikh ............... H04W 28/06
(Continued)

FOREIGN PATENT DOCUMENTS

WO    WO 2012/000566 A1    1/2012
WO    WO 2012/062379 A1    5/2012

OTHER PUBLICATIONS

International Search Report and Written Opinion of the International Searching Authority, Application No. PCT/EP2013/074244, dated Sep. 5, 2014.

(Continued)

*Primary Examiner* — Kibrom T Hailu
(74) *Attorney, Agent, or Firm* — Sage Patent Group

(57) ABSTRACT

A technique for handling a status of a connection for a call is provided. The connection has a signal path and a media path towards a terminating side. The signal path includes nodes at least some of which are to be informed of the status by a signal packet that is forwarded towards the terminating side of the connection on the signal path. One node inserts a media resource in the media path of the connection. The media resource provides media for announcing the status of the connection at the terminating side of the connection. The node includes in the signal packet, which signals the status to one or more of the nodes that are further towards the terminating side, a suppression indicator controlling suppression of media resource insertion at the one or more nodes. The node transmits the signal packet towards the terminating side on the signal path.

26 Claims, 7 Drawing Sheets

(51) Int. Cl.
*H04J 11/00* (2006.01)
*H04L 12/24* (2006.01)
*H04W 72/04* (2009.01)
*H04W 76/20* (2018.01)
*H04W 88/02* (2009.01)
*H04W 88/14* (2009.01)
*H04W 88/16* (2009.01)

(52) U.S. Cl.
CPC ........ *H04L 65/103* (2013.01); *H04L 65/1006* (2013.01); *H04L 65/1016* (2013.01); *H04L 65/80* (2013.01); *H04L 69/22* (2013.01); *H04W 72/0406* (2013.01); *H04W 76/20* (2018.02); *H04M 2207/187* (2013.01); *H04W 88/02* (2013.01); *H04W 88/14* (2013.01); *H04W 88/16* (2013.01)

(56) References Cited

U.S. PATENT DOCUMENTS

| | | | | |
|---|---|---|---|---|
| 2008/0146208 | A1 | 6/2008 | Ejzak et al. | |
| 2008/0240375 | A1* | 10/2008 | Chen ................. | H04L 29/06027 379/87 |
| 2009/0285157 | A1* | 11/2009 | Yeoum ................. | H04W 92/02 370/328 |
| 2013/0148548 | A1* | 6/2013 | Balaji ................. | H04L 65/1006 370/259 |
| 2013/0272194 | A1* | 10/2013 | Keller ............... | H04W 36/0022 370/328 |

OTHER PUBLICATIONS

3GPP, Technical Specification—"3rd Generation Partnership Project; Technical Specification Group Services and System Aspects; IP Multimedia Core Network Subsystem (IMS) Multimedia Telephony Service and supplementary services; Stage 1 (Release 12)", 3GPP TS 22.173 V12.4.0 (Jun. 2013), 72 pp.
3GPP, Technical Specification—"3rd Generation Partnership Project; Technical Specification Group Core Network and Terminals; Customised Applications for Mobile network Enhanced Logic (CAMEL) Phase 4; Stage 2 (Release 12)", 3GPP TS 23.078 V12.0.0 (Sep. 2013), 750 pp.
3GPP, Technical Specification—"3rd Generation Partnership Project; Technical Specification Group Services and System Aspects; IP Multimedia Subsystem (IMS) Service Continuity; Stage 2 (Release 12)", 3GPP Ts 23.237 V12.4.0 (Sep. 2013), 172 pp.
3GPP, Technical Specification—"3rd Generation Partnership Project; Technical Specification Group Services and System Aspects; IP Multimedia Subsystem (IMS) centralized services; Stage 2 (Release 12)", 3GPP TS 23.292 V12.1.0 (Mar. 2013), 120 pp.
3GPP, Technical Specification—"3rd Generation Partnership Project; Technical Specification Group Services and System Aspects; IP Multimedia Subsystem (IMS) centralized services; Stage 2 (Release 12)", 3GPP TS 23.292 V12.2.0 (Jun. 2013), 120 pp.
3GPP, Technical Specification—"3rd Generation Partnership Project; Technical Specification Group Core Network and Terminals; IP Multimedia (IM) Core Network (CN) subsystem Centralized Services (ICS); Stage 3 (Release 12)", 3GPP TS 24.292 V12.1.0 (Sep. 2013), 178 pp.
3GPP, Technical Specification—"3rd Generation Partnership Project; Technical Specification Group Core Network and Terminals; Customized Applications for Mobile network Enhanced Logic (CAMEL) Phase 4; CAMEL Application Part (CAP) specification for IP Multimedia Subsystems (IMS) (Release 12)", 3GPP TS 29.278 V12.0.0 (Jun. 2013), 45 pp.
Crocker et al., "Augmented BMF for Syntax Specifications: ABNF", Network Working Group, Request for Comments: 5234, Category: Standards Track, Jan. 2008, 15 pp.
Ejzak, Private Header (P-header) Extension to the Session Initiation Protocol (SIP) for Authorization of Early Media <draft-ejzak-sipping-p-em-auth-o4.txt>, SIPPING Working Group, Internet-Draft, Jun. 11, 2007, 16 pp.
Rosenberg, "The Session Initiation Protocol (SIP) Update Method", Network Working Group, Request for Comments: 3311, Category: Standards Track, Sep. 2002, 12 pp.
Rosenberg et al., Reliability of Provision Responses in the Session Initiation Protocol (SIP), Network Working Group, Request for Comments: 3262, Category: Standards Track, Jun. 2002, 13 pp.
Rosenberg et al., "SIP: Session Initiation Protocol", Network Working Group, Request for Comments: 3261, Category: Standards Track, Jun. 2002, 236 pp.

\* cited by examiner

METHODS FOR HANDLING A CONNECTION STATUS

CROSS REFERENCE TO RELATED APPLICATION

This application is a 35 U.S.C. § 371 national stage application of PCT International Application No. PCT/EP2013/074244, filed on Nov. 20, 2013, the disclosure and content of which is incorporated by reference herein in its entirety. The above-referenced PCT International Application was published in the English language as International Publication No. WO 2015/074683 A1 on Nov. 20, 2013.

TECHNICAL FIELD

The present disclosure generally relates to a technique for handling a status of a connection. More specifically, and without limitation, the disclosure relates to methods and devices for providing media depending on a status of a connection for a call.

BACKGROUND

IP Multimedia Subsystem (IMS) is a technology defined by the Third Generation Partnership Project (3GPP) to provide IP Multimedia services over mobile communication networks. IMS provides features to enrich the end-user communication experience by integration and interaction of services. The IMS uses the Session Initiation Protocol (SIP) to set up and control a call.

Network components involved in the call are collectively referred to as the connection between terminating sides of the call. The Session Description Protocol (SDP), which is carried by a SIP message, is used to describe and negotiate media components for the connection. For media transmission, a data protocol different from a control protocol is used along a media path that at least partially deviates from a signal path carrying the SIP messages.

The connection extends along a plurality of nodes, a multiplicity of which is adapted to insert audio announcements, e.g., speech or tones. For example, the multiplicity of nodes or all nodes have to consistently update their internal status. In some cases, each of the multiplicity of nodes may insert an announcement in the media path, e.g., responsive to the status update.

A connection including multiple nodes capable of playing announcements can be due to service centralization requiring that the connection remains anchored at a certain node of the network, so that a mobile connection extends along an increased number of nodes of the network after a User Equipment (UE) is handed-over to another type of access network.

As an example for a hand-over between different types of access networks, before 4G network coverage according to 3GPP Long Term Evolution (LTE) is sufficient to allow 2G and 3G networks to be completely replaced, a call initiated using a Packet-Switched (PS) network access must be handed-over to a Circuit-Switched (CS) network access provided by a 2G network according to the Global System for Mobile communications (GSM) or a 3G network according to the Universal Mobile Telecommunications System (UMTS), which use GERAN and UTRAN, respectively, as radio access network technology. WO 2012/062379 describes a connection including a signal path and a media path that change as the UE is moving out of LTE coverage.

IMS Centralized Services (ICS), as specified in standard document 3GPP TS 23.292, version 12.1.0, allows IMS sessions using CS bearers to be treated as standard IMS sessions. ICS defines signaling mechanism between the UE and the IMS for transport of information to centralize the services in the IMS. Standard document 3GPP TS 23.237, version 12.4.0, defines additional procedures needed for service continuity of media transport when handing over to the CS network access. ICS thus allows for delivery of consistent IMS services to the user regardless of the attached access type. Services and service control are based on IP Multimedia (IM) Core Network (CN) subsystem mechanisms, while using CS access for the media bearer.

In previous 2G and 3G networks, basic call and supplementary services were always executed in the mobile access node. According to the standard document 3GPP TS 24.292, version 12.1.0, connections originating from an ICS subscriber using both the IM CN subsystem and the CS domain are anchored in the IM CN subsystem. This results in a spreading of the basic and supplementary call-related services among the access network node, to which the mobile ICS subscriber is wirelessly coupled, and the IMS service network, e.g., by spreading the connection over access network and IMS service network. Consequently, both the access network and the IMS service network provide nodes capable of playing announcements. The service centralization in the IMS can be implemented by a Service Centralization and Continuity Application Server (SCC AS) and a Multimedia Telephony Application Server (MMTel AS).

Since it is difficult to replace an existent mobile access network by an ICS network providing the same level of service, ICS is introduced stepwise in networks providing in parallel 2G and 3G access. At the beginning of the ICS introduction, the basic call and supplementary services are executed either in the access network node, to which the ICS subscriber is coupled, or in the IMS service network. As a final target of the ICS introduction, the execution of all services is concentrated in the IMS network.

As long as the service concentration does not reach this final target and services are executed in more than one node in the network, events that trigger an announcement can be detected at more than one node of the network. This may cause uncoordinated, especially status-related events, (e.g., parallel, overlapping or mutually interrupted) speech announcements and tone playing by multiple nodes.

SUMMARY

Accordingly, there is a need for a technique that enhances announcing a status of a connection.

According to one aspect, a method of handling a status of a connection for a call is provided. The connection comprises a signal path and a media path towards a terminating side, the signal path including nodes at least some of which are to be informed of the status by a signal packet that is forwarded towards the terminating side of the connection on the signal path. The method comprising the following steps performed by one of the nodes: inserting or triggering inserting of a media resource in the media path of the connection, the media resource providing media for announcing the status of the connection at the terminating side of the connection; including in the signal packet, which signals the status to one or more of the nodes that are further towards the terminating side, a suppression indicator for controlling suppression of media resource insertion at the one or more nodes; and transmitting the signal packet towards the terminating side on the signal path of the connection.

According to another aspect, a method of handling a status of a connection for a call is provided. The connection comprises a signal path and a media path towards a terminating side, the signal path including nodes at least some of which are to be informed of the status by a signal packet that is forwarded towards the terminating side of the connection on the signal path. The method comprises the following steps performed by one of the nodes: receiving, on the signal path of the connection, the signal packet from one of the nodes further afar the terminating side of the connection, wherein the signal packet signals the status of the connection; analyzing the signal packet as to a suppression indicator for controlling suppression of media resource insertion at the receiving node; and selectively inserting or selectively triggering inserting of a media resource in the media path of the connection depending on a result of the analysis, the media resource providing media for announcing the status at the terminating side of the connection, wherein the receiving node refrains from media resource insertion if the received signal packet includes the suppression indicator.

According to a still further aspect, a computer program product is provided, which comprises program code portions for carrying out any method described herein when the computer program product is executed on one or more computing devices. A computer-readable recording medium storing the computer program product according is also provided. The computer program product may be provided on one or more nodes of a data network, such as the Internet, for download to the computer-readable recording medium.

According to a hardware aspect, a device for handling a status of a connection for a call is provided. The connection comprises a signal path and a media path towards a terminating side, the signal path including nodes at least some of which are to be informed of the status by a signal packet that is forwarded towards the terminating side of the connection on the signal path. The device comprises: an inserting unit adapted to insert or trigger inserting of a media resource in the media path of the connection, the media resource providing media for announcing the status of the connection at the terminating side of the connection; an including unit adapted to include in the signal packet, which signals the status to one or more of the nodes that are further towards the terminating side, a suppression indicator for controlling suppression of media resource insertion at the one or more nodes; and a transmitting unit adapted to transmit the signal packet towards the terminating side on the signal path of the connection.

According to another hardware aspect, a device for handling a status of a connection for a call is provided. The connection comprises a signal path and a media path towards a terminating side, the signal path including nodes at least some of which are to be informed of the status by a signal packet that is forwarded towards the terminating side of the connection on the signal path. The device comprises: a receiving unit adapted to receive, on the signal path of the connection, the signal packet from one of the nodes further afar the terminating side of the connection, wherein the signal packet signals the status of the connection; an analyzing unit adapted to analyze the signal packet as to a suppression indicator for controlling suppression of media resource insertion at the receiving node; and an inserting unit adapted to selectively insert or selectively trigger inserting the media resource in the media path of the connection depending on a result of the analysis, the media resource providing media for announcing the status at the terminating side of the connection, wherein the device refrains from media resource insertion if the received signal packet includes the suppression indicator.

BRIEF DESCRIPTION OF THE DRAWINGS

In the following, the present disclosure will be described in more detail with reference to exemplary embodiments illustrated in the drawings, wherein FIG. 1 schematically illustrates a first exemplary connection including an embodiment of a device for handling a status of the connection.

DETAILED DESCRIPTION

Figure 1:
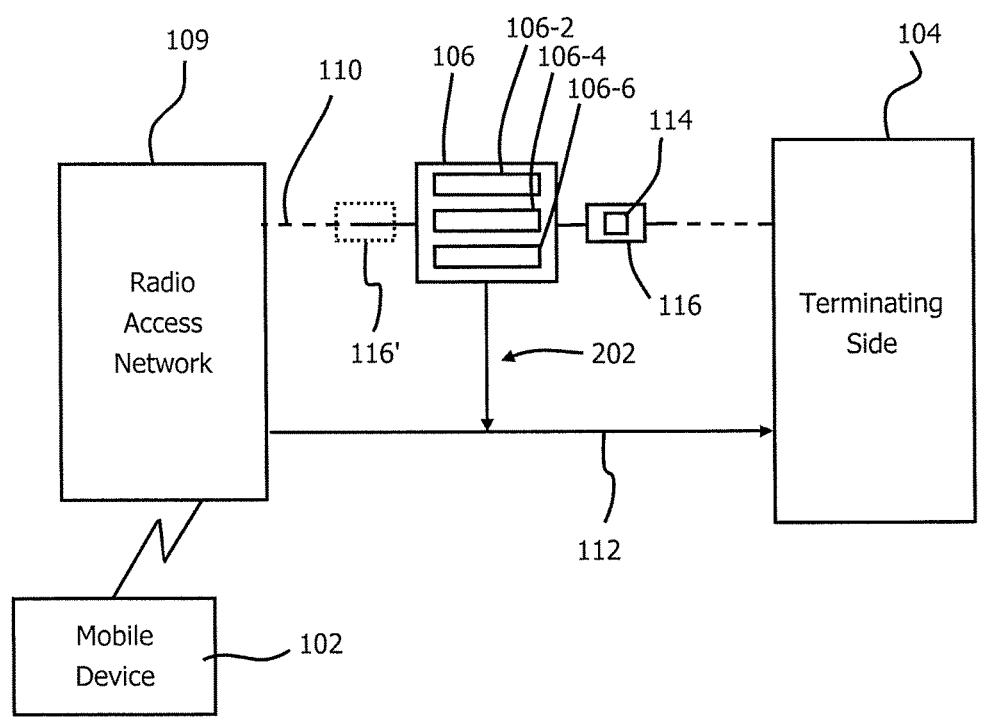

In the following description, for purposes of explanation and not limitation, specific details are set forth, such as specific device and system configurations and specific methods, steps and functions, in order to provide a thorough understanding of the technique presented herein. It will be appreciated that the technique may be practiced in other embodiments that depart from these specific details. While connections, nodes and networks described herein are consistent with the Global System for Mobile Communications (GSM), the Universal Mobile Telecommunications System (UMTS) and/or 3GPP Long Term Evolution (LTE), the technique is also applicable in networks using any other access technology or routing technology. For example, an access network used by one or more subscribers of the connection can include a Circuit-Switched (CS) access network (e.g., a Public Switched Telephone Network, PSTN), an IP Connectivity Access Network (IP-CAN, e.g., W-LAN and Cable DSL), and/or any other Radio Access Network consistent with the IP Multimedia (IM) Core Network (CN) subsystem (IMS), e.g., IMS Centralized Services (ICS) according to the specifications 3GPP TS 22.173 (Version 12.4.0), 3GPP TS 23.292 (Version 12.2.0) and 3GPP TS 24.292 (Version 12.1.0).

Those skilled in the art will further appreciate that the methods, steps and functions described herein may be implemented using individual hardware circuitry, using software functioning in conjunction with a programmed microprocessor or a general purpose computer, using one or more Application Specific Integrated Circuits (ASICs), one or more Digital Signal Processors (DSPs) and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions described herein when executed by the processor.

According to one aspect, a method of handling a status of a connection for a call is provided. The connection comprises a signal path and a media path towards a terminating side, the signal path including nodes at least some of which are to be informed of the status by a signal packet that is forwarded towards the terminating side of the connection on the signal path. The method comprising the following steps performed by one of the nodes: inserting or triggering inserting of a media resource in the media path of the connection, the media resource providing media for announcing the status of the connection at the terminating side of the connection; including in the signal packet, which signals the status to one or more of the nodes that are further towards the terminating side, a suppression indicator for controlling suppression of media resource insertion at the one or more nodes; and transmitting the signal packet towards the terminating side on the signal path of the connection.

The signal packet may signal the status to one or more of the nodes, which are further towards the terminating side of the connection along the signal path of the connection, e.g., compared to the one node performing the method steps. The signal packet may signal the status to one or more of the nodes, which are further afar an originating side of the connection along the signal path of the connection an originating side of the connection along the signal path of the connection, e.g., compared to the one node performing the method steps.

The "first" node along the signal path, which inserts the media resource, can at least in some implementations prevent that other nodes further towards the terminating side also insert media resources, thus avoiding overlapping and mutually interrupted announcements.

The node transmitting the signal packet including the suppression indicator may be referred to as a transmitting node. The signal path may be packet-switched or circuit-switched. The signal path may also be partially circuit-switched and packet-switched. E.g., the signal path may be circuit-switched from an originating side to the transmitting node and packet-switched from the transmitting node towards the terminating side.

The connection may be a connection between mobile devices, e.g., coupled to the transmitting node and the terminating side, respectively. The call may be an audio call, a video call or any other data transmitting session. For example, documents such as texts or images may be exchanged during a conference call. The nodes along the signal path may form a chain of nodes. Alternatively or in addition, one or more of the nodes may be branching points towards a further terminating side for the call, e.g., in the case of a conference call. In the chain of nodes towards the terminating side along the signal path, or in each chain of nodes towards one of the terminating sides, only one of the nodes may perform the method of the transmitting node.

The media may include audio and/or video. The connection may be in an early phase of the call. The media path may be set up before a callee or all callees answer the call. The media resource may provide early media.

The signal packet may signal the status to nodes further towards the terminating side along the signal path of the connection. The suppression indicator may be configured to control the suppression of media resource insertion at nodes further towards the terminating side. The suppression indicator may be configured to control suppression of media resource insertion at some or all of the nodes further (e.g., topologically closer) towards the one or more terminating sides than the transmitting node along the signal path.

The signal path may include the transmitting node, a terminating node at the terminating side and/or an intermediate node between the transmitting node and the terminating node. Some of the nodes of the signal path may also be nodes of the media path or control nodes controlling (e.g., triggering) nodes of the media path. The media path may deviate from the signal path following the intermediate node in the direction further towards the one or more terminating sides.

The call may be anchored in an IP Multimedia Subsystem, IMS. The intermediate node may provide a Call Session Control Function, CSCF, in the IMS. Alternatively or in addition, the intermediate node may provide an Access Transfer Control Function, (ATCF) in the IMS. The media path may include an Access Transfer Gateway (ATGW) in the IMS.

The transmitting node may further generate the signal packet. At least the steps of inserting, generating and/or including may cause, or may be responsive to, a change of the status. The call may include a mobile device wirelessly coupled to the transmitting node, e.g., via a Radio Access Network (RAN). The transmitting node may receive a trigger from the mobile device for the change of the status. The generation of the signal packet, the insertion of the media resource and/or the inclusion of the suppression indicator may be responsive to the trigger.

The transmitting node may be collocated with a Mobile Switching Centre, MSC. A first access leg of the connection may include an Evolved Packet Core (EPC) at the time the connection is established. The first access leg may further include an evolved UMTS Terrestrial Radio Access Network (e-UTRAN). The first access leg may not yet include the transmitting node. A second access leg of the connection may include the transmitting node in the MSC at the time the status is changed. The intermediate node may be included in both the first access leg and the second access leg. The ATCF and/or the ATGW may be included in both the first access leg and the second access leg. A Service Centralization and Continuity Application Server (SCC AS) may control an access transfer of the mobile device from the first access leg to the second access leg.

The status of the connection may change from a bidirectional media path to a unidirectional media path towards the terminating side, or vice versa. Alternatively or in synchronization, the status of the connection may change from an active call to a call on hold, or vice versa.

A packet-switched domain of the signal path may extend from the transmitting node to the terminating side. The signal packet may include a Session Initiation Protocol (SIP) message, e.g., a SIP Re-INVITE message. The connection may be established using the SIP, e.g., using a SIP INVITE message. The connection may be a SIP session. The connection may be specified using a Session Description Protocol (SDP). The signal packet may modify the SIP session and/or a session description. The suppression indicator may be included in the signal packet by adding a private header field in the signal packet to be transmitted. The private header field may include a suppression value.

According to another aspect, a method of handling a status of a connection for a call is provided. The connection comprises a signal path and a media path towards a terminating side, the signal path including nodes at least some of which are to be informed of the status by a signal packet that is forwarded towards the terminating side of the connection on the signal path. The method comprises the following steps performed by one of the nodes: receiving, on the signal path of the connection, the signal packet from one of the nodes further afar the terminating side of the connection, wherein the signal packet signals the status of the connection; analyzing the signal packet as to a suppression indicator for controlling suppression of media resource insertion at the receiving node; and selectively inserting or selectively triggering inserting of a media resource in the media path of the connection depending on a result of the analysis, the media resource providing media for announcing the status at the terminating side of the connection, wherein the receiving node refrains from media resource insertion if the received signal packet includes the suppression indicator.

The signal packet may be received from one of the nodes, which is further afar the terminating side of the connection along the signal path of the connection, e.g., compared to the one node performing the method steps. The signal packet may be received from one of the nodes, which is further towards an originating side of the connection along the signal path of the connection, e.g., compared to the one node performing the method steps.

The analysis of the signal packet as to the suppression indicator may be an analysis of the signal packet as to the presence of the suppression indicator and/or parameters defined by the suppression indicator.

Features corresponding to any one of the features of the transmitting node and/or steps corresponding to any one of the steps disclosed in the context of the method aspect performed by the transmitting node may also be implemented for the method aspect of the receiving node. The receiving node may be the intermediate node. Some or all nodes on the signal path, which are further towards the terminating side than the transmitting node, may perform the method aspect of the receiving node.

The received signal packet may trigger the steps of analyzing and selectively inserting. If the media resource is inserted in the media path, a suppression indicator for controlling suppression of media resource insertion at the one or more nodes further towards the terminating side may be included in the received signal packet or another signal packet, which signals the status to one or more nodes further towards the terminating side on a signal path of the connection. Alternatively or in combination, the signal packet including the suppression indicator may be forwarded towards the terminating side of the connection on the signal path.

If the received signal packet includes the suppression indicator for controlling suppression of media resource insertion, the signal packet including the suppression indicator may be forwarded towards the terminating side of the connection on the signal path. The received signal packet including the suppression indicator may be forwarded unmodified.

The suppression indicator may be included in a private header field of the received signal packet. The analysis may include reading the private header field potentially indicative of a suppression value.

According to a still further aspect, a computer program product is provided, which comprises program code portions for carrying out any method described herein when the computer program product is executed on one or more computing devices. A computer-readable recording medium storing the computer program product according is also provided. The computer program product may be provided on one or more nodes of a data network, such as the Internet, for download to the computer-readable recording medium.

According to a hardware aspect, a device for handling a status of a connection for a call is provided. The connection comprises a signal path and a media path towards a terminating side, the signal path including nodes at least some of which are to be informed of the status by a signal packet that is forwarded towards the terminating side of the connection on the signal path. The device comprises: an inserting unit adapted to insert or trigger inserting of a media resource in the media path of the connection, the media resource providing media for announcing the status of the connection at the terminating side of the connection; an including unit adapted to include in the signal packet, which signals the status to one or more of the nodes that are further towards the terminating side, a suppression indicator for controlling suppression of media resource insertion at the one or more nodes; and a transmitting unit adapted to transmit the signal packet towards the terminating side on the signal path of the connection.

According to another hardware aspect, a device for handling a status of a connection for a call is provided. The connection comprises a signal path and a media path towards a terminating side, the signal path including nodes at least some of which are to be informed of the status by a signal packet that is forwarded towards the terminating side of the connection on the signal path. The device comprises: a receiving unit adapted to receive, on the signal path of the connection, the signal packet from one of the nodes further afar the terminating side of the connection, wherein the signal packet signals the status of the connection; an analyzing unit adapted to analyze the signal packet as to a suppression indicator for controlling suppression of media resource insertion at the receiving node; and an inserting unit adapted to selectively insert or selectively trigger inserting the media resource in the media path of the connection depending on a result of the analysis, the media resource providing media for announcing the status at the terminating side of the connection, wherein the device refrains from media resource insertion if the received signal packet includes the suppression indicator.

Any one of the units disclosed for the hardware aspects, or a dedicated unit, may further be adapted to perform steps disclosed in the context of above method aspects.

FIG. 1 schematically illustrates a first example of a connection 100 between a mobile device 102 and a terminating side 104 via a node that includes an embodiment of a device 106 for handling a status of the connection 100. The connection 100 is established for a call, or is to be established for the call (e.g., in an early dialog state). The mobile device 102 can be a caller of the call and the terminating side 104 can be a callee for the call, or vice versa. The connection can include more than two subscribers, e.g., for a conference call.

The connection 100 comprises a signal path 110 and a media path 112. The mobile device 102 is wirelessly connected via a Radio Access Network (RAN) 109 to the node 106. In a variant of the connection 100, the device 106 is included in the RAN 109. As to a backhaul network and/or in the case of a circuit-switched RAN 109, the node 106 can be considered as an edge of a chain of nodes forming at least the signal path 110 of the connection 100. For example, over a portion of the signal path 110 between the RAN 109 and the node 106, the connection 100 may be a circuit-switched connection. Alternatively, the entire signal path 110 may include a packet-switched connection or a circuit-switched connection.

Figure 2:
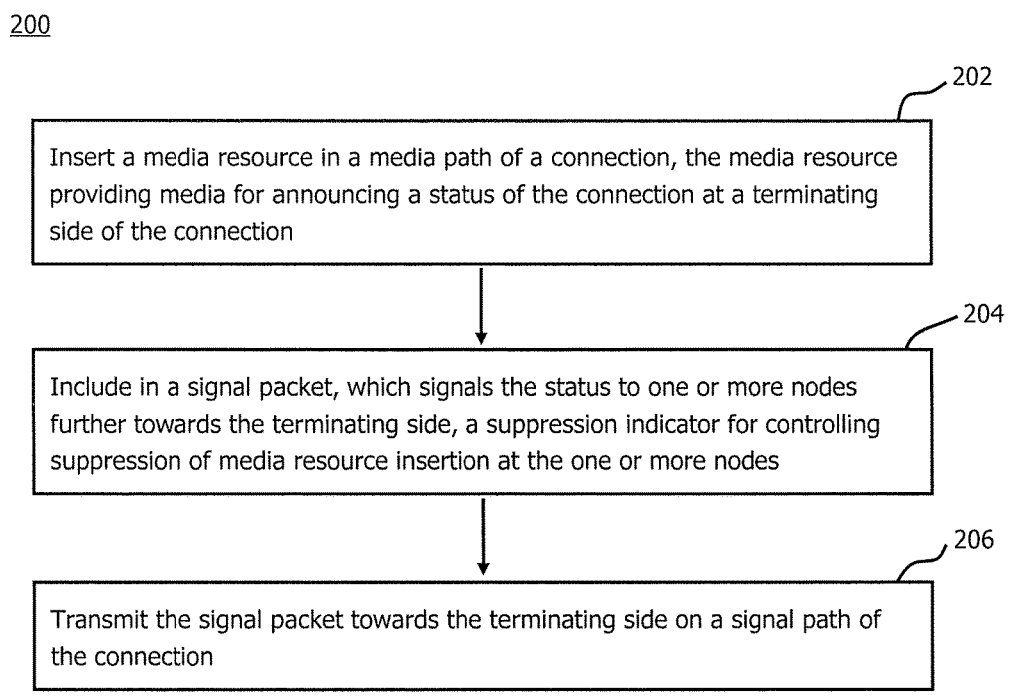
FIG. 2 shows a flowchart of a method embodiment for operating the device shown in FIG. 1.

FIG. 2 shows a flowchart of a method 200 of handling a status of a connection for a call. The connection comprises a signal path and a media path towards a terminating side. The signal path includes nodes at least some of which are to be informed of the status by a signal packet that is forwarded towards the terminating side of the connection on the signal path. The order of steps of the method 200 may deviate from the order indicated by vertical arrows in FIG. 2.

The method 200 can be performed in the context of the connection 100 shown in FIG. 1. Dashed sections of the signal path 110 optionally include further nodes, e.g., depending on the connection 100 or a network topology used for implementing the connection 100. In an exemplary implementation of the method 200, the device 106 performs at least some of the steps of the method 200.

In a step 202 of the method 200, a media resource is inserted in the media path 112, as is indicated by an arrow 202 in FIG. 1. The media resource provides media for announcing the status of the connection at the terminating side 104 of the connection 100.

In a step 204, a suppression indicator 114 is included into a received or generated signal packet 116' resulting in a signal packet 116, as is shown for the exemplary connection 100 in FIG. 1. The signal packet 116' is configured to signal the status of the connection 100 to one or more nodes further towards the terminating side 104 (which optionally includes a node at the terminating side 104). The signal packet 116 inherits the capability of signaling the status. In addition, the suppression indicator 114 is configured for controlling suppression of media resource insertion at the one or more nodes.

In some implementations of the method 200, the signal packed 116' is received as the trigger without the suppression indicator 114, e.g., at the device 106. In an alternative implementation, a dedicated trigger not structured as a signal packet is received. The dedicated trigger is indicative of the status of the connection requiring media resource insertion. In this case, the node 106 performing the step 202 generates the signal packed 116' for the step 204, or the node 106 performing the step 202 directly generates the signal packet 116 so that the step 204 is part of generating the signal packet 116.

In a step 206 of the method 200, the signal packet 116 including the suppression indicator 114 is transmitted towards the terminating side 104 on the signal path 110 of the connection 100.

The embodiment of the device 106 shown in FIG. 1 comprises units 106-2, 106-4 and 106-6 for performing the steps 202, 204 and 206, respectively.

The status of the connection 100 can be a recently changed status or a new status to which the connection 100 is to be changed. The status may be changed responsive to a trigger. When the trigger is generated by one of the two or more subscribers participating in the call, the signal packet 116 propagates away from the triggering subscriber towards one or more of the other subscribers participating in the call. For example, the mobile device 102 sends the trigger towards the node 106, which transmits the packet 116 in the step 206.

Figure 3:
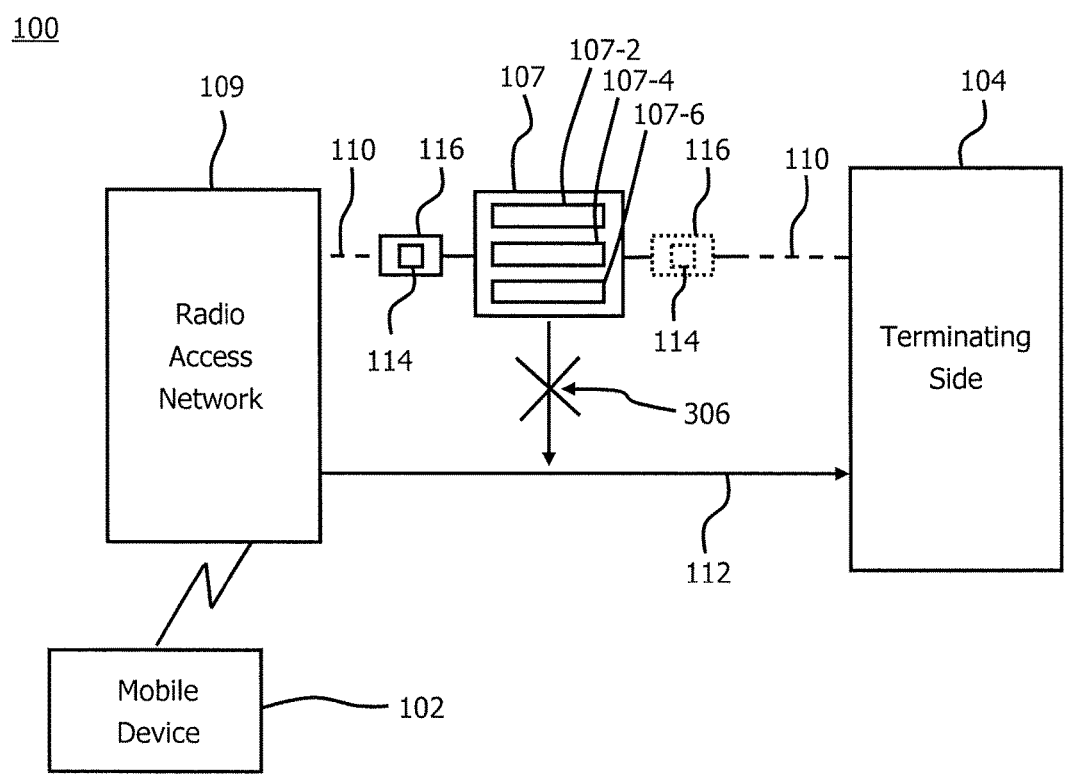
FIG. 3 schematically illustrates a second exemplary connection including an embodiment of a device for handling a status of the connection.

FIG. 3 schematically illustrates a second example of a connection 100 including an embodiment of a device 107 for handling a status of the connection. The description of the connection 100 with reference to FIG. 1 applies to the connection 100 shown in FIG. 3. In particular, corresponding reference signs in FIGS. 1 and 3 relate to corresponding features.

Figure 4:
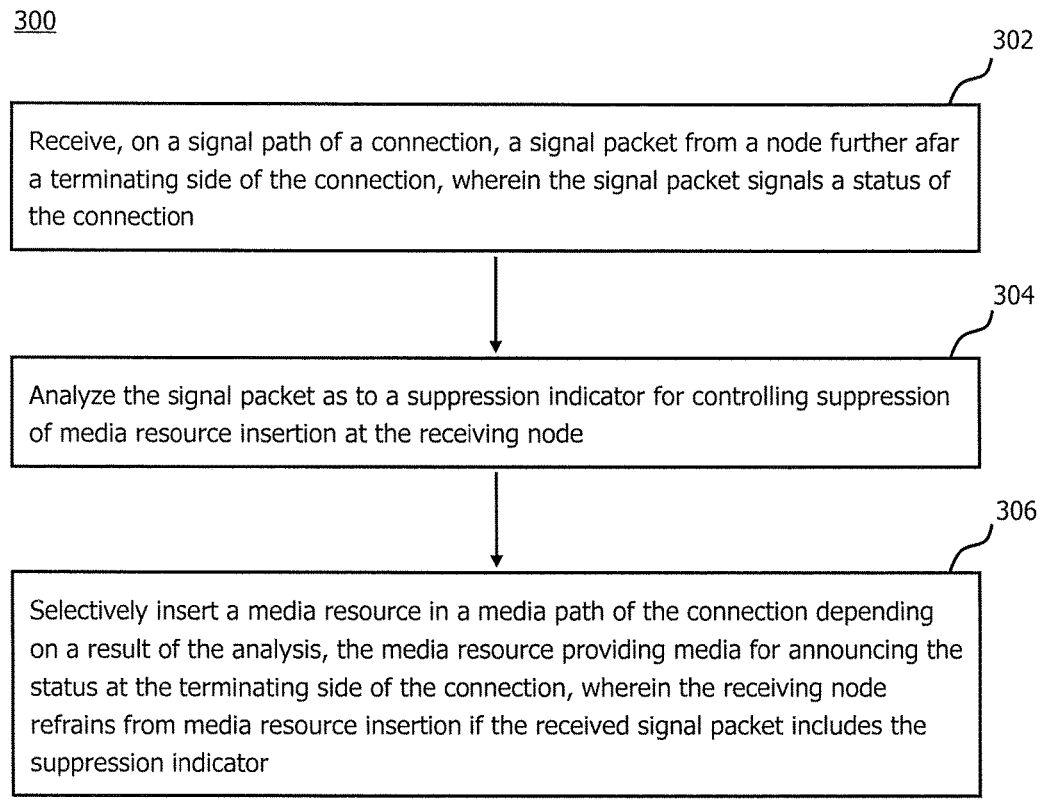
FIG. 4 shows a flowchart of a method embodiment for operating the device shown in FIG. 3.

FIG. 4 shows a flowchart of a method 300 of handling a status of a connection for a call. The connection comprises a signal path and a media path towards a terminating side. The signal path includes nodes at least some of which are to be informed of the status by means of a signal packet that is forwarded towards the terminating side of the connection on the signal path. The method 300 can be performed in the context of the connection 100 shown in FIG. 3, e.g., by the device 107. The order of steps of the method 300 may deviate from the order indicated by vertical arrows in FIG. 4.

In a step 302 of the method 300, a signal packet 116 is received on the signal path 110 from a node further or far to be terminating side 104 relative to the device 107. The signal packet 116 can be received from a node between the radio access network 109 and the device 107, e.g., from the device 106 shown in FIG. 1. The signal packet 116 signals a status of the connection 100.

In a step 304, the signal packet 116 is analyzed as to a suppression indicator 114 configured for controlling suppression of media resource insertion at the receiving node, e.g., the device 107.

In a step 306 of the method 300, a media resource is selectively inserted in the media path 112 of the connection 100 depending on a result of the analysis in the step 304. The media resource provides media for announcing the status at the terminating side 104 of the connection. The node receiving the signal packet 116, e.g., the device 107, refrains from media resource insertion, if the received signal packet 116 includes the suppression indicator 114, as is illustrated by the crossed-out arrow 306 in FIG. 3.

The embodiment of the device 107 shown in FIG. 3 comprises units 107-2, 107-4 and 107-6 for performing the steps 302, 304 and 306, respectively.

Figure 5:
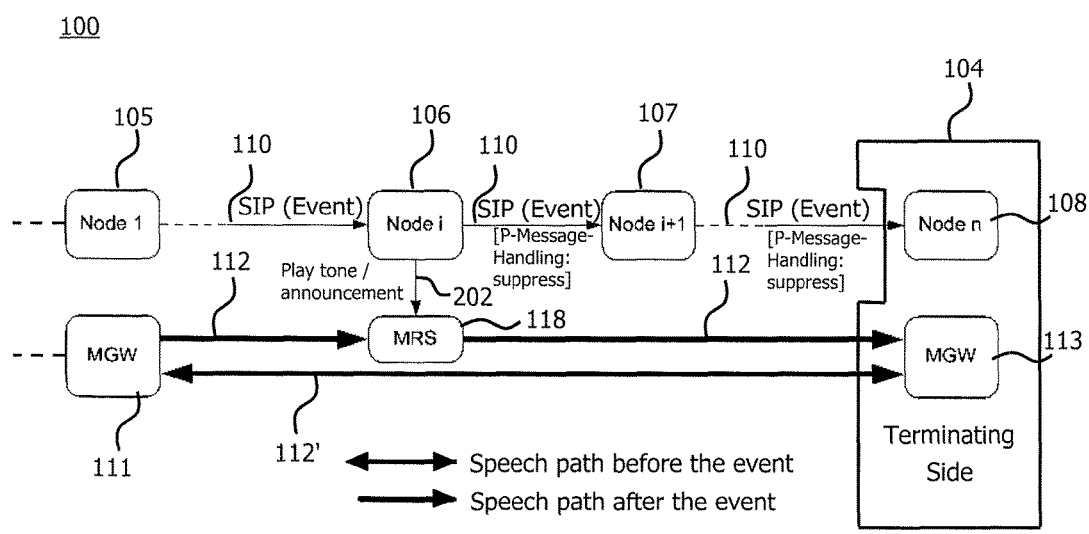
FIG. 5 schematically illustrates a third exemplary connection including an embodiment of the device shown in FIG. 1 and an embodiment of the device shown in FIG. 3.

FIG. 5 schematically illustrates a third exemplary connection 100 including a plurality of nodes 105 to 108 along the signal path 110. Corresponding reference signs in FIG. 5 indicate corresponding features described with reference to the FIGS. 1 and 3. The connection 100 shown in FIG. 5 includes both a transmitting node (e.g., performing the method 200 and/or including the device 106 described with reference to FIG. 1) and a receiving node (e.g., performing the method 300 and/or including the device 107 described with reference to FIG. 3).

The technique, e.g., as described for each of the three exemplary connections 100, prevents in certain situations that announcements (e.g., speech announcements or tones) are being played simultaneously from multiple nodes (e.g., the nodes 107 and 108) along the signal path 110 in response to a call-related event, or that the announcement caused by the node 106 is interrupted by a further announcement of the node 107 and/or the node 108. The call-related events encompass, e.g., a change in the status of the connection 100. The signal packet 116 traverses the signal path 110, e.g., from one end to another end of the connection 100.

Examples for implementing the signal packet 116 include a Session Initiation Protocol (SIP) message, a Direct Transfer Application Part (DTAP) message, an ISDN User Part (ISUP) signaling message, or any other packet-switched or circuit-switched message protocol.

The suppression indicator 114 is inserted in the node 106 by adding a private header to the SIP message 116. The node 116 is the first node in the chain of nodes 105 to 108 along the signal paths 110, which plays the announcement (e.g., a tone) in response to the event. As the signal packet 116 including the suppression indicator is forwarded along the signal path 110, all receiving nodes (e.g., the nodes 107 and 108) adapted to insert media resources analyze the signal packet 116 and refrain from media resource insertion, if the suppression indicator 114 is detected. The receiving nodes 107 and 108 forward the signal packet 116 including the added private header in the SIP message they send further towards the terminating side 104.

The receiving nodes, e.g., the nodes 107 and 108, are thus informed as to the event, e.g., for changing an internal status of the receiving nodes, and the suppression indicator indicates that no media resource insertion at the receiving node is necessary.

The technique thus allows, at least in some implementations, one and only one announcement (e.g., a tone) to be played for the call-related event. The first node 106 in the chain of nodes 105 to 108 along the signal path 110, which plays an announcement, includes the suppression indicator 114 in the SIP message 116 to suppress the playing of further announcements for that specific event. The SIP message 116 is traversing the entire chain of nodes of the signal path 110 of the connection 100, e.g., end-to-end. The SIP message 116 carrying the suppression indicator 114 is forwarded to all remaining nodes in the signal path towards the terminating side 104.

The call-related event includes, for example, setting an active call on hold by one of the subscribers of the call. The active call uses a bidirectional media path 112' between a first Media Gateway (MGW) 111 at the side of the mobile device 102 and a second MGW 113 at the terminating side 104. The mobile device 102 at the side of the MGW 111 triggers the hold event. When the mobile device 102, as an ICS subscriber, triggers the change of the active call using media path 112', the ICS subscriber uses the Communication Hold mid-call service in the IMS. The signal packet 116' without the suppression indicator 114 is the trigger for the mid-call service, e.g., a SIP Re-Invite message 116', which indicates that the bidirectional media path 112' of the connection 100 has to be changed from the bidirectional state (which is also denoted as through-connected) used for the active call to a unidirectional media path 112 towards the terminating side 104. The media path 112 also extends from the first MGW 111 to the second MGW 113. The unidirectional media path 112 permits sending an indication about the activation of the Communication Hold mid-call service in the form of the announcement towards the terminating side 104. This includes the possibility of playing music or other audio media as the announcement.

Upon reception of the SIP Re-Invite message 116' indicating that the media path 112' has to be changed from bidirectional to the unidirectional media path 112, the node 106 forwards the signal packet 116 towards the terminating side 104. The signal packet 116 passes through all nodes 107 and 108 involved in the signal path 110 of the connection 100 until the last node, to which a terminating device, e.g., another mobile subscriber of the call, is coupled.

In parallel with transmitting the signal packet 116, the node 106 inserts a device configured for playing media, e.g., a MGW or a Media Resource Server (MRS) 118, in the media path 112 and starts playing the announcement (e.g., speech, a tone or music) towards the terminating side 104 indicating that the call is put on hold.

In one implementation of the method 200, the node 106 performs the steps 202 and 204 (and optionally the step 206) at least substantially simultaneously. Alternatively or in combination, the media resource insertion according to the step 202 and the suppression indicator inclusion according to the step 204 are correlated. For example, the node 106 either inserts the media resource and includes the suppression indicator or forwards the signal without the suppression indicator.

If the node 106 fails triggering or rendering the media, e.g., if one of the steps 202 and 204 fails, the node 106 performing the method 200 refrains from performing the other one of the steps 202 and 204. Consequently, either the node 106 inserts the media resource and includes the suppression indicator according to both steps 202 and 204, or the node 206 completes none of the steps 202 and 204.

While the technique is described with reference to FIG. 5 for a certain number of nodes, the technique is not limited as to a number of nodes that are closer to the originating node than the node 106 inserting the media resource in the step 202 and transmitting the signal packet 116 in the step 206. The technique is also not limited as to a certain number of nodes that follow the transmitting node 106 towards the terminating side. For example, if the node 106 fails allocating resources required for generating the announcement in the MRS 118, the node 106 refrains from both inserting media resources according to the step 202 and including the suppression indicator 114 according to the step 204. Consequently, the task of inserting the media resource is shifted to the next node 107 further towards the terminating side 104 without violating the uniqueness requirement for the node inserting the media resource for the specific event. In this case, the node 107 performs the method 200 (e.g., instead of the method 300).

Furthermore, while the connection 100 shown in FIG. 5 includes a linear chain of nodes in the signal path 100, the connection 100 can include one or more branching points, e.g., for a conference call.

While the technique has been described with reference to FIG. 5 for a call hold event signaled by means of an SIP message, the technique is not limited to a certain call-related event or a certain protocol for the signal packet 116.

The technique does not require that all nodes in the connection 100 implement the technique. E.g., some of the nodes in the connection 100 that are adapted to insert media resources are also adapted to perform at least one of the methods 200 and 300 in an exemplary implementation. The more nodes are adapted to perform at least one of the methods 200 and 300, the lower is the probability of simultaneous or mutually interrupting announcements. Preferably, all nodes adapted to insert media resources are also adapted to at least one of analyze the signal packet 116 according to the step 304 and to include the suppression indicator 114 according to the step 204.

Every node in the signal path 110 is adapted to forward the signal packet 116 including the suppression indicator 114 to the next node in the signal path 110 without dropping or modifying the suppression indicator 114. For legacy nodes not yet adapted to perform one of the methods 200 and 300, the suppression indicator 114 is transparently forwarded as part of the signal packet 116. In other words, the legacy node forwards the signal packet 116 including the suppression indicator 114 as if it was a conventional signal packet 116'.

For the case of a signal packet 116 and 116' implemented as an SIP message, the suppression indicator 116 is introduced in the private header of the SIP message 116'. The private header for handling the status of the connection 100 is also referred to as P-Message-Handling. The syntax for the P-Message-Handling header field is represented below using the Augmented Backus-Naur Form (ABNF) according to RFC 4234. The syntax is an extension to the ABNF for SIP according to RFC 3261, Sect. 7.3 applying RFC 5234:

P-Message-Handling="P-Message-Handling" HCOLON
  [em-param*(COMMA em-param)]
em-param="suppress"/token In above definition of the P-Message-Handling, the value token leaves open the possibility of extending the value range represented by the private header for future use cases.

Below Table 1 functionally describes the P-Message-Handling header field. Table 1 is an extension of Tables 2 and 3 in RFC 3261 for the P-Message-Handling header field. The column "PRA" indicates the PRACK method for the Reliability of Provisional Responses defined in RFC 3262. The column "UPD" indicates the UPDATE method, which modifies the state of a session without changing the state of the dialog according to RFC 3311.

TABLE 1

| Header field | where | ACK | BYE | CAN | INV | OPT | REG | PRA | UPD |
|---|---|---|---|---|---|---|---|---|---|
| P-Message-Handling | Req | 0 | 0 | 0 | 0 | 0 | 0 | 0 | 0 |
| P-Message-Handling | 18x | — | — | — | 0 | — | — | — | — |
| P-Message-Handling | 2xx | 0 | 0 | 0 | 0 | 0 | 0 | 0 | 0 |

When a node, e.g., the node 106, in the call chain of the connection 100 decides playing an announcement (e.g., a tone) for an event, the node includes in the SIP message 116 the P-Message-Handling header with the value "suppress", indicating that no other announcement should be played for this event.

All other nodes receiving a SIP message 116, e.g., the nodes 107 and 108, check the presence of the P-Message-Handling header. If the header includes the value "suppress", the receiving node does not play any announcement for the event, and if the receiving node forwards the SIP message 116 along the call chain of the connection 100, the receiving node includes the unmodified P-Message-Handling header in the forwarded message 116.

All nodes in the ICS network preferably implement the handling of the P-Message-Handling header fields included in the SIP messages 116, because the default behavior for interpreting SIP messages includes ignoring unknown message elements. Furthermore, enabling early media setup in the network is a prerequisite for announcement playing before the call is established.

Media resources are inserted in the media path 112 for rendering the announcement. Such resources are normally part of a media gateway (MGW) or a Media Resource Server (MRS). By way of example, the control node 106 (e.g., functioning as a control node) in the signaling path 110 inserts the media resources by instructing the MGW or the MRS to add specific terminations into existing contexts so as to modifying the existing connection 100. The number of available announcement-rendering components in the MGW or the MRS is limited. In a high-traffic situation, it can happen that all available components are already in use or otherwise allocated. In such a situation, the node 106 is not capable of inserting another announcement for the given connection. In this case, no suppression indicator is inserted in the signaling path by the node 106. This allows subsequent nodes to insert the announcement, if they have free resources.

Figure 6:
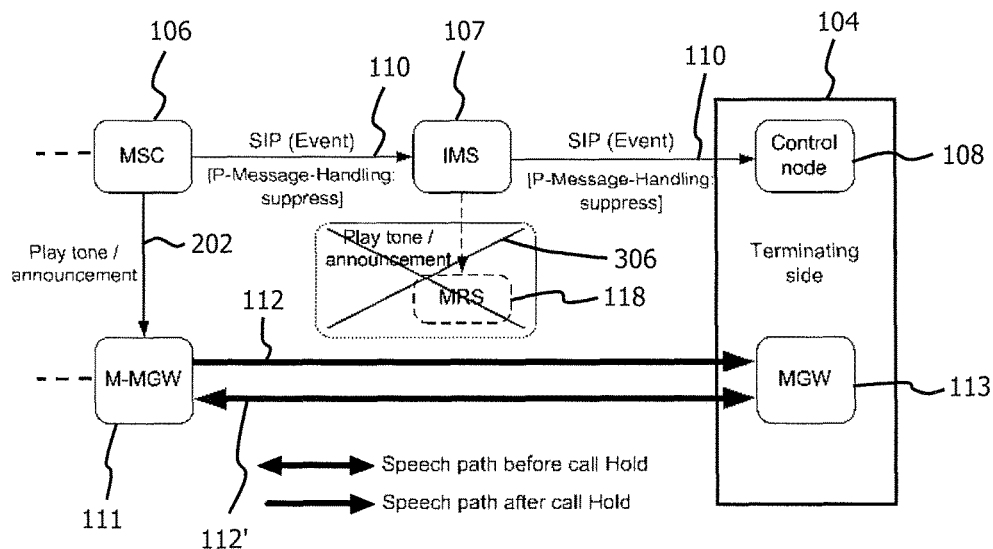
FIG. 6 schematically illustrates an implementation of the connection of FIG. 5 providing IP Multimedia Subsystem services.

FIG. 6 schematically illustrates further details of the connection shown in FIG. 5. The mobile device 102 as the ICS subscriber is connected to the node 107 including the IMS via the node 106 including a Mobile Switching Center (MSC). The MSC is implemented as a soft switch. The media path 112 is anchored at the MGW 111. The MGW 111 has hardware resources for rendering the announcement. The MGW 111 is implemented separately from the MSC 106 corresponding to the separation of media path 112 and signal path 110, respectively. Furthermore, the separation of MSC 106 and MGW 111 allows for a layered architecture including the MSC 106 as a control server (MSC-S) and the MGW 111 as the slave being controlled by the MSC 106. The media paths of mountable connections 100 can thus use the MGW 111.

While the MGW 111 can be considered as a 3G network node, it also supports GSM networks. The mobile device 102 is thus wirelessly coupled to the core network components 106 and 111 via a 2G or 3G radio access network 109 in the situation shown in FIG. 6.

When the ICS subscriber 102 wants to set an active call on hold while being coupled to the MSC 106, the Call Hold mid-call service in the MSC 106 is triggered. The MSC 106 sends the SIP Re-Invite Message 116 towards the next node 107 in the chain of nodes of the signal path 110. The node 107 includes the IMS functionality. The SIP Re-Invite Message 116 indicates that the media path 112' has to be changed from bidirectional to the unidirectional media path 112. The MSC 106 starts playing the announcement towards the terminating side 104.

Conventionally, the IMS 107 would also insert the media resource responsive to the SIP Re-Invited Message 116' (without the suppression indicator 114) and forward the message 116' towards the terminating side 104. Therefore, conventional nodes in the chain of nodes of the signal path 110 might additionally modify the media path 112 and/or decide inserting media resources for rendering an announcement towards the terminating side 104. How these nodes along the signal path behave depends on the access network type to which the nodes belong. Consequently, the conventional behavior is complex and unpredictable, since ICS aims at merging all existing radio access network types in a single ICS network. For example, the conventional SIP Re-Invite Message 116' would cause the IMS to insert the media resource 118, as if the SIP Re-Invite Message came from an LTE network.

The technique prevents in the situation illustrated in FIG. 6 that the announcement played from the MSC 106 is interrupted by a later started announcement played from the IMS 107.

According to the method 200 applied to the situation shown in FIG. 6, the MSC 106 starts playing an announcement towards the terminating side 104, when the call-hold is triggered. In the same period of time, the MSC 106 sends the signal packet 116 including a SIP Re-Invite Message towards the IMS 107 indicating the modification of the media path 112' to the media path 112 from bidirectional to unidirectional connectivity.

The MSC 106 further includes in the signal packet 116 the P-Message-Handling private header with value "suppress" as the suppression indicator 114. Upon reception of the signal packet 116, the IMS 107 does not insert the MRS 118 in the media path 112, as is indicated at reference sign 306 in FIG. 6. Consequently, the IMS 107 performing the method 300 will not play a further announcement. Moreover, the IMS 107 forwards the signal packet 116 including the SIP Re-Invite Message towards the terminating side 104 with the P-Message-Handling private header included and set to the value "suppress".

Consequently, the technique applied to the situation illustrated in FIG. 6 avoids that the announcement rendered in the step 202 by the MGW 111 under the control of the MSC 106 is interrupted by any one of the subsequent nodes 107, 108 in the chain of the signal path 110 towards the terminating side 104. Here, the technique prevents unpredictable and annoying effects at the terminating side 104.

Figure 7:
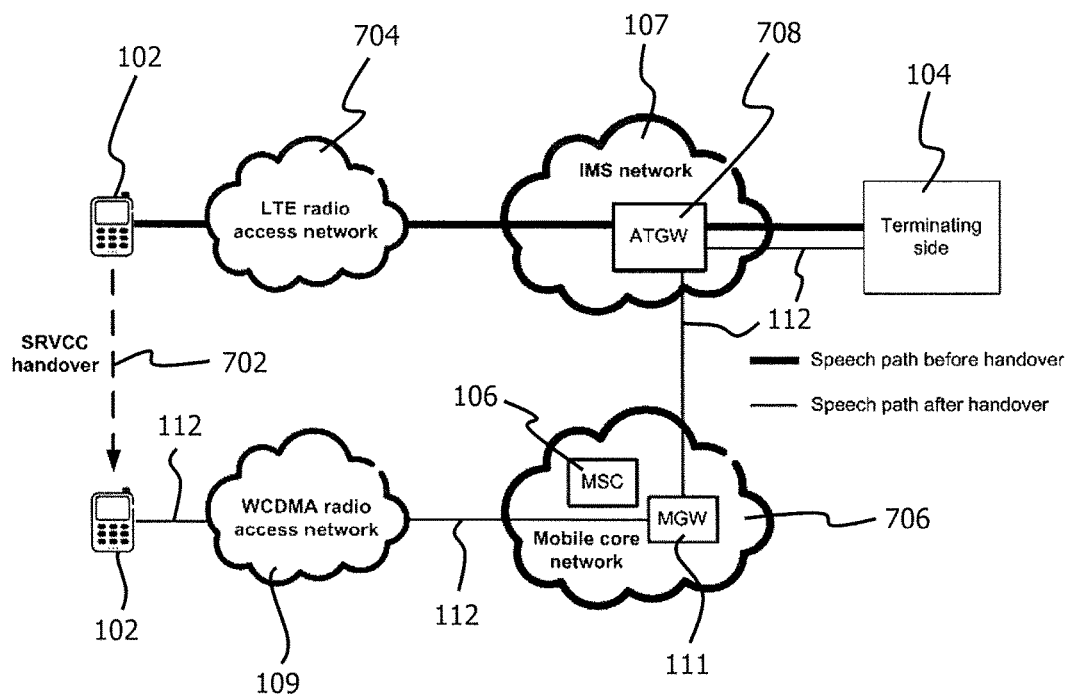
FIG. 7 schematically illustrates the connection shown in FIG. 6 as a result of a handover.

FIG. 7 schematically illustrates a Single Radio Voice Call Continuity (SRVCC) handover 702 of the mobile device 102 giving raise to the situation discussed for the connection 100 illustrated in FIG. 6. Only the media path 112 of the connection 100 is shown in FIG. 7 for the clarity of the illustration. Before the handover 702, the mobile device 102 as the ICS subscriber is attached to an LTE RAN 704, which is also referred to as a 4G network. Services are provided to the mobile device 102 by its home IMS network 107, e.g., a Serving-Call Session Control Function (S-CSCF) in the IMS 107. Each call from or towards the mobile device 102 is anchored in the home IMS network 107, e.g., in the Access Transfer Gateway (ATGW). Before the handover 702, all call-related announcements are played from the IMS network 107 by inserting the MRS 118 in the media path 112 and controlled by the IMS network 107. All call-related signaling between the LTE RAN 704 and the IMS network 107 is based on the SIP.

When the mobile device 102 moves out of the radio coverage area of the LTE RAN 704, the SRVCC provides a handover to the circuit-switched access via the RAN 109.

The SRVCC handover 702 is attaching the mobile device 102 as the ICS subscriber to the RAN 109. The RAN 109 belongs, for example, to a GSM network including the MSC 106 and the MGW 111 described with reference to FIG. 6. FIG. 7 schematically illustrates an alternative RAN 109 providing Wideband Code Division Multiple Access (WCDMA), which is also known as a 3G network. In both cases, the mobile device 102 as the ICS subscriber is attached to the MSC 106, while the media path 112 is not anchored in the 2G or 3G core network 706 and remains anchored at an Access Transfer Gateway (ATGW) in the IMS network 107.

As has become apparent based on above exemplary embodiments, at least some of the embodiments prevent simultaneous, mutually overlapping or subsequently interrupting announcements, e.g., audio announcements or tones, being rendered for an event in an ICS network.

At least some implementations of the technique allow network operators to configure in a predictable manner which announcement to render and/or which of the nodes is to control media resource insertion for the event, e.g., an event related to a call or a supplementary service of the call. Same or other implementations may increase the degree of freedom in network configuration. The presented mechanism provides the possibility for a network operator to select by changing the network configuration one or more control nodes in the signal path from which an announcement is to be inserted. In this way, the operator has improved control over the media resources in the network.

From the perspective of an end user, e.g., at a terminating side of a connection, no annoying or overlapping announcements are rendered.

It will be apparent by those skilled in the art that the embodiments described above may be adapted or extended in various ways. Accordingly, the scope of the invention is defined only by the claims.

The invention claimed is:

1. A method of handling a status of a connection for a call, the connection comprising a signal path and a media path towards a terminating side, the signal path including nodes at least some of which are to be informed of the status by a signal packet that is forwarded towards the terminating side of the connection on the signal path, the method comprising the following steps performed by one of the nodes:
   inserting or triggering inserting of a media resource in the media path of the connection, the media resource providing media for announcing the status of the connection to a recipient at the terminating side of the connection;
   including in the signal packet, which signals the status to one or more of the nodes that are further towards the terminating side, a suppression indicator for controlling suppression of media resource insertion at the one or more nodes; and
   transmitting the signal packet towards the terminating side along the signal path of the connection.

2. The method of claim 1, wherein the signal path includes a transmitting node, a terminating node at the terminating side and an intermediate node between the transmitting node and the terminating node.

3. The method of claim 2, wherein the call is anchored in an IP Multimedia Subsystem, IMS, and the intermediate node provides an Access Transfer Control Function, ATCF, in the IMS.

4. The method of claim 3, wherein the media path includes an Access Transfer Gateway, ATGW, in the IMS.

5. The method of claim 1, wherein the steps of inserting and including are responsive to a change of the status.

6. The method of claim 5, wherein the call includes a mobile device wirelessly coupled to the transmitting node, the transmitting node receiving a trigger from the mobile device for the change of the status.

7. The method of claim 1, wherein the transmitting node is located in a Mobile Switching Centre, MSC.

8. The method of claim 7, wherein a first access leg of the connection includes an Evolved Packet Core, EPC, when the connection is established, and wherein a second access leg of the connection includes the transmitting node in the MSC when the status is changed.

9. The method of claim 5, wherein the status of the connection is changed from a bidirectional media path to a unidirectional media path towards the terminating side.

10. The method of claim 5, wherein the status of the connection is changed from an active call to a call on hold.

11. The method of claim 1, wherein a packet-switched domain of the signal path extends from the transmitting node to the terminating side.

12. The method of claim 1, wherein the signal packet is a Session Initiation Protocol, SIP, packet.

13. The method of claim 12, wherein the suppression indicator is included in the signal packet by adding a private header field indicative of a suppression value.

14. The method of claim 1, wherein a failure in the step of inserting the media resource suppresses the step of inserting the suppression indicator so that the signal packet is transmitted without the suppression indicator.

15. A method of handling a status of a connection for a call, the connection comprising a signal path and a media path towards a terminating side, the signal path including nodes at least some of which are to be informed of the status by a signal packet that is forwarded towards the terminating side of the connection on the signal path, the method comprising the following steps performed by one of the nodes:
- receiving, on the signal path of the connection, the signal packet from one of the nodes further away from the terminating side of the connection, wherein the signal packet signals the status of the connection;
- analyzing the signal packet to determine whether a suppression indicator for controlling suppression of media resource insertion at the receiving node is included in the signal packet; and
- selectively inserting or selectively triggering inserting of a media resource in the media path of the connection depending on a result of the analysis, the media resource providing media for announcing the status at the terminating side of the connection, wherein the receiving node refrains from media resource insertion if the received signal packet includes the suppression indicator.

16. The method of claim 15, wherein the call is anchored in an IP Multimedia Subsystem, IMS, and the receiving node is located in the IMS.

17. The method of claim 16, wherein the receiving node further provides an Access Transfer Control Function, ATCF, in the IMS.

18. The method of claim 16, wherein the media path includes an Access Transfer Gateway, ATGW, in the IMS.

19. The method of claim 15, wherein the steps of analyzing and selectively inserting are triggered by the received signal packet.

20. The method of claim 15, further comprising
- responsive to if the media resource is inserted in the media path, including in the received signal packet or another signal packet, which signals the status to one or more nodes further towards the terminating side on a signal path of the connection, a suppression indicator for controlling suppression of media resource insertion at the one or more nodes further towards the terminating side; and
- forwarding the signal packet including the suppression indicator towards the terminating side of the connection on the signal path.

21. The method of claim 15, further comprising
- responsive to if the received signal packet includes the suppression indicator for controlling suppression of media resource insertion, forwarding the signal packet including the suppression indicator towards the terminating side of the connection on the signal path.

22. The method of claim 1, wherein the signal packet is a Session Initiation Protocol, SIP, packet.

23. The method of claim 22, wherein the suppression indicator is included in the signal packet in a private header field indicative of a suppression value.

24. A computer program product comprising a non-transitory computer readable storage medium storing program code for performing the steps of claim 1 when the program code is executed by a computing device.

25. A device for handling a status of a connection for a call, the connection comprising a signal path and a media path towards a terminating side, the signal path including nodes at least some of which are to be informed of the status by a signal packet that is forwarded towards the terminating side of the connection on the signal path, the device comprising:
- at least one processor; and
- at least one memory storing program code that when executed by the at least one processor causes the at least one processor to perform operations comprising:
- inserting or triggering inserting of a media resource in the media path of the connection, the media resource providing media for announcing the status of the connection to a recipient at the terminating side of the connection;
- including in the signal packet, which signals the status to one or more of the nodes that are further towards the terminating side, a suppression indicator for controlling suppression of media resource insertion at the one or more nodes; and
- transmitting the signal packet towards the terminating side along the signal path of the connection.

26. A device for handling a status of a connection for a call, the connection comprising a signal path and a media path towards a terminating side, the signal path including nodes at least some of which are to be informed of the status by a signal packet that is forwarded towards the terminating side of the connection on the signal path, the device comprising:
- at least one processor; and
- at least one memory storing program code that when executed by the at least one processor causes the at least one processor to perform operations comprising:
- receiving, on the signal path of the connection, the signal packet from one of the nodes further away from the terminating side of the connection, wherein the signal packet signals the status of the connection;
- analyzing the signal packet to determine whether a suppression indicator for controlling suppression of media resource insertion at the receiving node is included in the signal packet; and
- selectively inserting or selectively triggering insertion of a media resource in the media path of the connection depending on a result of the analysis, the media resource providing media for announcing the status at the terminating side of the connection, wherein the device refrains from media resource insertion if the received signal packet includes the suppression indicator.

* * * * *